(12) United States Patent
Lim et al.

(10) Patent No.: US 9,715,244 B2
(45) Date of Patent: Jul. 25, 2017

(54) SYSTEM AND METHOD FOR DETERMINING ADAPTER CURRENT LIMIT

(71) Applicant: INTERSIL AMERICAS LLC, Milpitas, CA (US)

(72) Inventors: Sungkeun Lim, Cary, NC (US); Mehul D. Shah, Morrisville, NC (US); Lei Zhao, Cary, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 42 days.

(21) Appl. No.: 14/727,397

(22) Filed: Jun. 1, 2015

(65) Prior Publication Data
US 2016/0246316 A1    Aug. 25, 2016

Related U.S. Application Data
(60) Provisional application No. 62/120,042, filed on Feb. 24, 2015.

(51) Int. Cl.
*H02M 3/156* (2006.01)
*G05F 1/56* (2006.01)
(Continued)

(52) U.S. Cl.
CPC .................. *G05F 1/56* (2013.01); *H02J 1/00* (2013.01); *H02M 1/32* (2013.01); *H02M 3/158* (2013.01); *H02M 2001/0009* (2013.01)

(58) Field of Classification Search
CPC ... G05F 1/56; H02M 1/32; H02M 2001/0009; H02M 3/158; H02J 1/00
(Continued)

(56) References Cited

U.S. PATENT DOCUMENTS 8,264,211 B2 * 9/2012 Martinez ............ H03K 17/0822
                                                                323/282
9,075,422 B2 * 7/2015 Vemula .................... G05F 1/573
(Continued)

OTHER PUBLICATIONS

Search report from STIC EIC 2800 searcher Christian Miner received on Jun. 28, 2016.*
(Continued)

*Primary Examiner* — Gary L Laxton
*Assistant Examiner* — Htet Z Kyaw
(74) *Attorney, Agent, or Firm* — Foley & Lardner LLP; Mark J. Danielson (57) ABSTRACT

An electronic device that determines an adapter current limit for a power adapter, including a regulator, a voltage comparator, and a controller. The regulator regulates an adapter output current level to prevent it from exceeding the adapter current limit, and provides a regulation signal during regulation. The voltage comparator provides an under-voltage signal when adapter output voltage level falls below a low voltage threshold. The controller initially sets the adapter current limit at a lowest level, increases the adapter current limit by an incremental amount when the regulation signal is provided, and when the under-voltage signal is provided, decreases the adapter current limit by the incremental amount to determine a final adapter current limit. The final adapter current limit is at or near the actual maximum current limit of the power adapter. The adapter current limit may be increased only when regulation occurs for at least a predetermined time period.

19 Claims, 5 Drawing Sheets

(51) Int. Cl.
  *H02J 1/00* (2006.01)
  *H02M 1/32* (2007.01)
  *H02M 1/00* (2006.01)
  *H02M 3/158* (2006.01)

(58) Field of Classification Search
  USPC .......................................................... 323/280
  See application file for complete search history.

(56) References Cited

U.S. PATENT DOCUMENTS

| | | | | |
|---|---|---|---|---|
| 9,134,775 | B2* | 9/2015 | Ye | G06F 1/26 |
| 9,136,724 | B2* | 9/2015 | Ye | H02J 7/0068 |
| 9,153,999 | B2* | 10/2015 | Hawawini | H02J 7/04 |
| 9,166,442 | B1* | 10/2015 | Belch | |
| 9,430,008 | B2* | 8/2016 | Li | G06F 1/26 |
| 2004/0108843 | A1* | 6/2004 | Lanni | G05F 1/56 |
| | | | | 323/271 |
| 2008/0258688 | A1* | 10/2008 | Hussain | H02J 7/06 |
| | | | | 320/145 |
| 2012/0139500 | A1* | 6/2012 | Ye | H02J 7/0068 |
| | | | | 320/135 |
| 2013/0320942 | A1* | 12/2013 | Vemula | G05F 1/573 |
| | | | | 323/274 |
| 2014/0062207 | A1* | 3/2014 | Lu | H02J 7/0068 |
| | | | | 307/80 |
| 2014/0176106 | A1* | 6/2014 | Toosky | H02M 3/158 |
| | | | | 323/285 |
| 2014/0181546 | A1* | 6/2014 | Hallberg | G06F 1/3206 |
| | | | | 713/320 |
| 2015/0134980 | A1* | 5/2015 | Chen | G06F 1/263 |
| | | | | 713/300 |

OTHER PUBLICATIONS

"Test Methods for DC/DC Power Modules." Ericsson Power Modules, Design Notes 027, Jul. 2010. pp. 1-7.
"How Does the HiLevel Current Limit Work?" ETS2K Q'n Apps at www.hilevel.com #E59. Downloaded from http://www.hilevel.com/QNAPPe59.pdf on Apr. 23, 2015. p. 1.
"BQ24780 Datasheet V3P2." Texas Instruments Version 3P2, Jan. 22, 2014. pp. 1-34.
"I²C Controlled 2.5A Single Cell USB/Adapter Charger with Narrow VDC Power Path Management and USB OTG." Texas Instruments. BQ24196 Oct. 2012 p. 1-41.
Wong, Samuel. "Dynamic Power Management for Faster, More Efficient Battery Charging." Analog Applications Journal, 4Q, 2013. *High-Performance Analog Products*. Texas Instruments Incorporated, Power Management. pp. 15-18.
Ye, Jing et al. "Extract Maximum Power from the Supply When Charging a Battery." Analog Applications Journal, 2Q, 2014 *High-Performance Analog Products*. Texas Instruments Incorporation, Power Management. pp. 9-13.

* cited by examiner

SYSTEM AND METHOD FOR DETERMINING ADAPTER CURRENT LIMIT

CROSS-REFERENCE TO RELATED APPLICATIONS

This application claims the benefit of U.S. Provisional Application Ser. No. 62/120,042, filed on Feb. 24, 2015 which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

An electronic device may receive power from any one or more of multiple power sources. Many electronic devices are configured to operate with a rechargeable battery that supplies power to the electronic device when other power sources are not available. Battery-operated devices may further be implemented with at a power interface for coupling to a power adapter. The power adapter is often in the form of a removable alternating current to direct current (AC/DC) adapter that converts AC voltage from an AC line to a DC voltage level. The power adapter may be configured to provide power to the electronic device and to recharge the battery. The power interface detects the available power sources, such as a power adapter and a battery, and manages power to the circuitry of the electronic device.

The electronic device may range from a smaller mobile device such as a smart phone and the like, to a larger portable device such as a notebook, a tablet or a laptop computer system or the like. In any of these conventional configurations, the output current capacity of the power adapter should not be exceeded for a significant period of time. In some conventional configurations, the power interface is configured for the particular type of electronic device to operate with a corresponding known power adapter with known voltage and current limits. These configurations require multiple power interfaces to be provided for the different types of electronic devices. Other conventional configurations include a communication interface or the like in which the capacity of the power adapter is communicated to the power interface. These conventional configurations complicate the design and implementation of power interface thereby consuming valuable resources at additional expense.

A power interface as described herein interfaces a power adapter for providing power to an electronic device. The power interface includes a power interface controller that detects the presence or absence of the power adapter and determines a maximum current limit for the power adapter when connected. The power interface controller may be implemented as a battery controller in which it further detects the state of a rechargeable battery for making power decisions. For the battery powered configurations, when the power adapter is not present and the battery is available and sufficiently charged, then the power interface couples the battery to provide power to the system load. When the power adapter is present, the power interface couples the output of the power adapter to provide power to the system load.

A power interface controller as described herein may be incorporated within any one of multiple types of electronic devices, including smaller mobile devices that have lower power requirements to larger devices that consume greater power levels with increased load current. The power interface controller is not directly provided with information about the type of power adapter to which it is coupled, so that it is not provided with the maximum current capacity of the power adapter. Instead, the power interface controller detects the presence of the power adapter and automatically determines its maximum current limit capacity.

Figure 1:
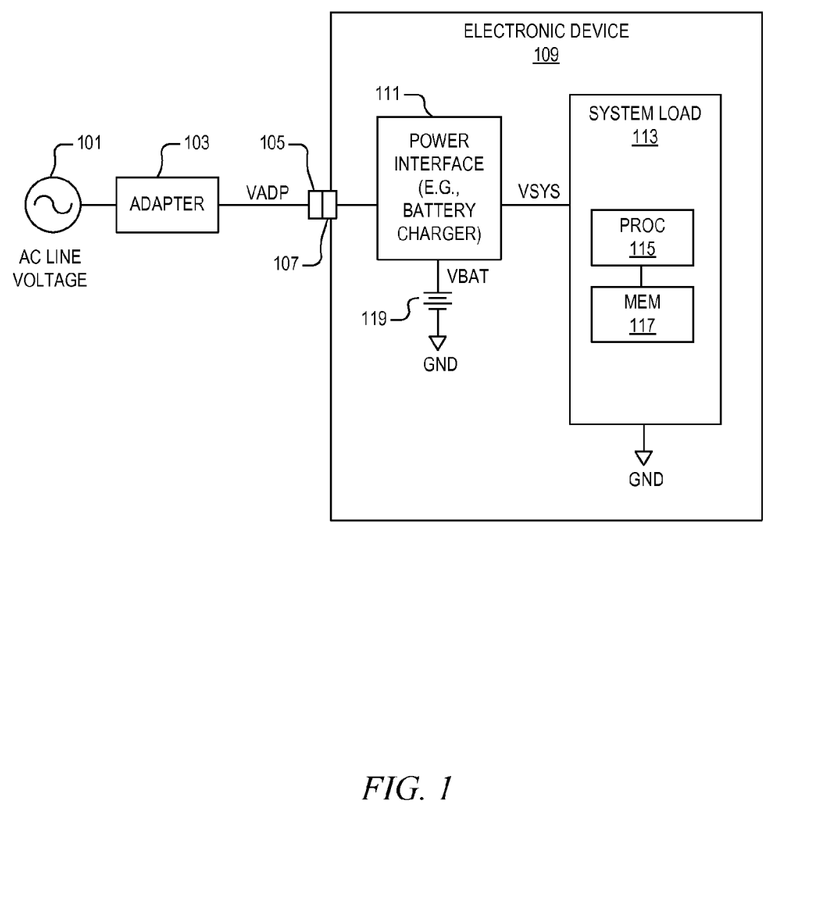
FIG. 1 is a simplified block diagram of an electronic device including a power interface implemented according to one embodiment of the present invention.

FIG. 1 is a simplified block diagram of an electronic device 109 including a power interface 111 implemented according to one embodiment of the present invention. The power interface 111 may be implemented as a battery charger, although alternative configurations are contemplated. An AC line voltage shown at 101 is provided to the input of a power adapter 103, which converts the AC voltage to a DC adapter voltage VADP. The voltage level of VADP and the current capacity of the power adapter 103 should be suitable for providing sufficient power to the electronic device 109. Many different types of electronic devices are contemplated. The electronic device 109 may range from a smaller mobile device such as a smart phone and the like, to a larger portable device such as a notebook, a tablet or a laptop computer system or the like. A power adapter for the smaller electronic devices may have a relatively small output current limit, whereas a power adapter for larger electronic devices may have a larger output current limit. Also, certain electronic devices may have multiple power ports for receiving a range of input power current levels.

The power adapter 103 represents any of a variety of different adapters with various capabilities depending upon the type and capabilities of the electronic device 109. For example, if the electronic device 109 is a smaller device, such as a smart phone or cell phone or the like, then the power adapter 103 may output a lower output voltage and/or a lower output current for providing sufficient power to a smaller device. If the electronic device 109 is a larger device, such as a notebook or laptop computer system or the like, then the power adapter 103 may output a higher output voltage and/or a higher output current for providing sufficient power to a larger device. The power interface 111 may be incorporated within any of these electronic devices 109.

The output current capacity, or maximum current limit, of the power adapter 103 is not known or otherwise not communicated when connected. As described further herein, the power interface 111 is configured to detect connection of the power adapter 103, to identify the maximum current limit of the power adapter 103, and to maintain load current at or below the determined maximum current level.

VADP is shown provided by a suitable connector 105, which mates with a compatible connector 107 (or power port) mounted to or provided with the electronic device 109. In this manner, VADP is provided to an input of the power interface 111, which provides an output voltage VSYS to a system load 113. A rechargeable battery 119 provides a battery voltage VBAT to another input of the power interface 111 for developing VSYS when the adapter 103 is not available. The battery 119 and the system load 113 are shown referenced to ground (GND), where is it understood that GND generally represents any suitable positive or negative voltage level and/or multiple ground types, such as power ground, signal ground, analog ground, chassis ground, etc.

The electronic device 109 may be any type of electronic device, including mobile, portable, or handheld devices, such as, for example, any type of personal digital assistant (PDA), personal computer (PC), portable computer, laptop computer, etc., cellular phone, personal media device, etc. The primary functions of the electronic device 109 are performed by the system load 113, which may include one or more different system load elements. In the illustrated embodiment, the system load 113 includes a processor 115, such as a microprocessor or controller or the like, which is coupled to any combination of any type of memory 117 commonly used for electronic devices, such as various types and configurations of random access memory (RAM) and read-only memory (ROM) and the like.

Figure 2:
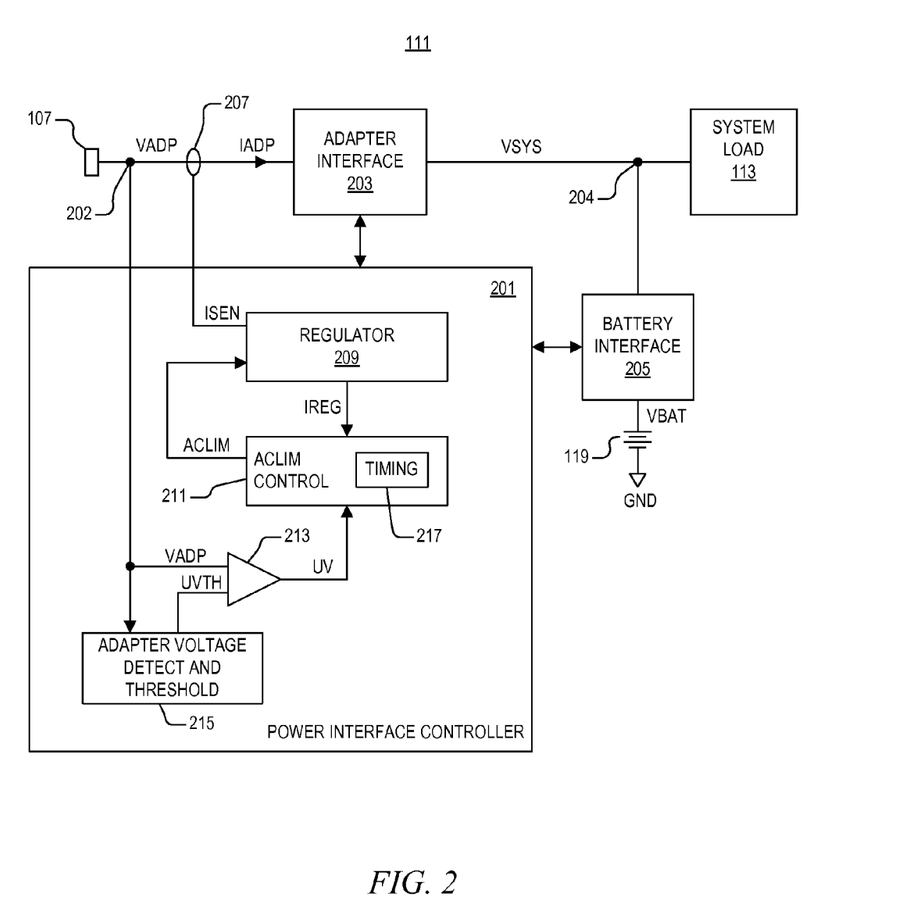
FIG. 2 is a simplified block diagram of the power interface of FIG. 1 including a power interface controller implemented according to one embodiment of the present invention.

FIG. 2 is a simplified block diagram of the power interface 111 implemented according to one embodiment of the present invention. The power interface 111 includes a power interface controller 201 coupled to control an adapter interface 203 and a battery interface 205. The power interface controller 201 may be implemented as a battery charge controller, although alternative configurations are contemplated. The voltage VADP of the power adapter 103 is received via the connector 107 and developed on node 202, which is shown coupled to an input of the adapter interface 203. A current sensor 207 (or other current sensing apparatus) monitors the adapter current IADP provided from the power adapter 103 to the adapter interface 203, and provides or is otherwise used to develop a corresponding current sense signal ISEN. The current sensor 207 may be a current sensing resistor or the like, in which ISEN is a proportional voltage indicative of IADP. Various current sensing means are known and are not further described herein. The adapter interface 203 includes an output coupled to an output node 204 developing the voltage VSYS, which is provided to the system load 113. Node 204 is also coupled to an input of the battery interface 105, which is further coupled to the rechargeable battery 119 providing VBAT.

The power interface controller 201 includes a regulator 209, which has one input coupled to the current sensor 207 for receiving or otherwise developing ISEN, which has another input receiving a power adapter current limit value ACLIM, and which has an output providing a current regulation signal IREG to an ACLIM control block 211. The regulator 209 may be coupled to control either or both of the adapter interface 203 and the battery interface 205. The power interface controller 201 also includes an adapter voltage comparator 213, which has an input receiving the adapter voltage VADP (or a sensed version thereof), which has another input receiving an under-voltage threshold (UVTH) signal, and which has an output providing an under-voltage signal UV to the ACLIM control block 211.

The power interface controller 201 also includes an adapter voltage detect and threshold circuit 215, which receives the adapter voltage VADP and which provides the UVTH signal to the adapter voltage comparator 213. The adapter voltage detect and threshold circuit 215 detects the voltage level of VADP and sets the level of UVTH accordingly. The ACLIM control block 211 develops the ACLIM signal using the IREG and UV signals as further described herein. The ACLIM control block 211 may include a timing block 217, which may be implemented as a timer or counter or the like.

The adapter interface 203 may be implemented according to any one of many suitable configurations depending upon the particular application. In one embodiment, the adapter interface 203 includes isolation switches or the like (e.g., coupled in back-to-back connection) for isolating the system node 204 from node 202, such as when the power adapter 103 is not connected or is newly connected. In this case, when the power adapter 103 is detected, the power interface controller 201 activates the isolation switches within the adapter interface 203 to provide a low impedance path from VADP to VSYS. In addition or in the alternative, the adapter interface 203 includes a voltage converter that converts the voltage level of VADP to the voltage level of VSYS. For example, VADP may have a higher voltage level than VSYS, in which case the adapter interface 203 may be implemented as a buck converter or the like. In another configuration, VADP may have a lower voltage level than VSYS, in which case the adapter interface 203 may be implemented as a boost converter or the like. Also, the voltage level of VSYS may range from a low level below an expected voltage level of VADP to a higher level above VADP, in which case the adapter interface 203 may be implemented as a buck-boost converter or the like depending upon actual voltage levels.

The battery interface 205 may also be implemented according to any one of many suitable configurations depending upon the particular application. The battery interface 205 may be configured to receive charge current from the power adapter 103 via the power interface controller 201. The battery interface 205 may include a switch that is activated to connect VBAT to VSYS for charging the battery 119, or otherwise for discharging battery current to the system load 113. In one embodiment, the battery interface 205 includes a switch that is operated in a linear manner to control battery charge current to from VSYS to the battery 119.

In one embodiment, the adapter voltage detect and threshold circuit 215 is configured to detect the presence of the power adapter 103 via detection of VADP provided on node 202. In one embodiment, the adapter voltage detect and threshold circuit 215 detects the voltage level of VADP and programs UVTH accordingly. In one embodiment, VADP may have any one of multiple voltage levels, such as 5 Volts (V) or 19V or the like. UVTH may have a preset value for each expected voltage level of VADP, such as UVTH=4.5V when VADP is 5V, or UVTH=17V when VADP is 19V, etc. Alternatively, the adapter voltage detect and threshold circuit 215 may be configured to assert UVTH at a percentage of VADP (e.g., 90% or the like). In any of these configurations or embodiments, UVTH is set at a level to indicate a low voltage threshold level of VADP.

Once VADP is detected and UVTH is set, the adapter voltage comparator 213 is configured to compare VADP with UVTH and assert the under-voltage signal UV when VADP falls below UVTH.

The regulator 209 performs regulation functions by regulating one of multiple parameters via corresponding control loops. One of the control loops includes regulation of the adapter current IADP at ACLIM to prevent the IADP from rising above a current limit of the power adapter 103. Whenever the regulator 209 is regulating the adapter current IADP, it asserts a current regulation signal IREG provided to the ACLIM control block 211. The ACLIM control block 211 receives and uses IREG to set ACLIM at the appropriate level as further described herein.

Figure 3:
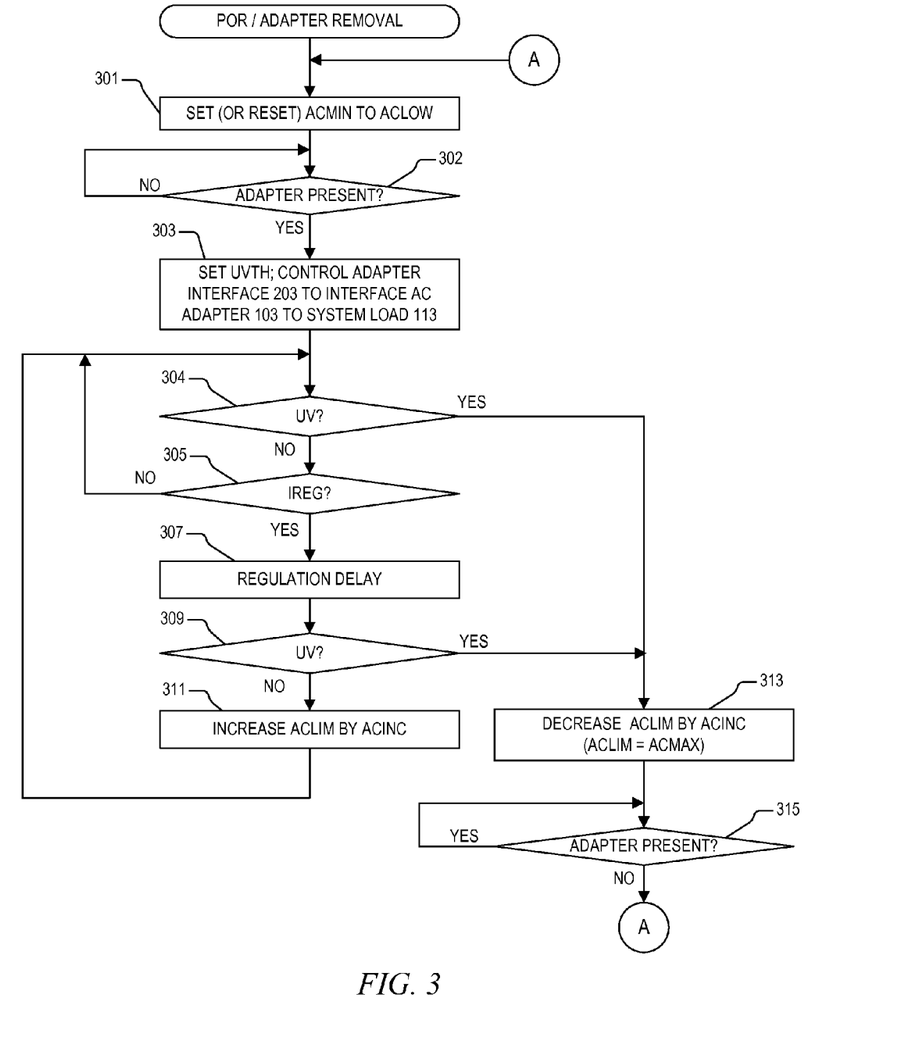
FIG. 3 is a flowchart diagram illustrating operation of the power interface controller of FIG. 2 implemented according to one embodiment for detecting adapter current limit of a power adapter coupled to the electronic device of FIG. 1.

FIG. 3 is a flowchart diagram illustrating operation of the power interface controller 201 implemented according to one embodiment for detecting adapter current limit of an adapter (e.g., power adapter 103) coupled to the electronic device 109. After power on or reset (POR), or if the power adapter 103 has been connected but is subsequently removed, operation advances to block 301 in which the ACLIM control block 211 initially sets or otherwise resets ACMIN to a predetermined lowest value, shown as ACLOW, which is suitable for the entire range of possible power adapters to be coupled to the electronic device 109. For example, ACLOW is set sufficiently low to be at or below the maximum current limit of the smallest of the expected power adapters coupled to the possible range of electronic devices. In one embodiment, for example, ACLOW may be 400 milliamps (mA) or 500 mA or the like.

At next block 302, it is queried whether the power adapter 103 is present. As noted previously, the adapter voltage detect and threshold circuit 215 may perform this function by detecting the VADP voltage. When the power adapter 103 is not present, the power interface controller 201 may be performing other functions, such as controlling the battery interface 205 to enable the battery 119 to provide power to the system load 113. Operation remains at block 302 while the power adapter 103 is not detected.

When the power adapter 103 is detected, operation advances to block 303 to perform housekeeping functions to prepare for adapter operation. As noted previously, the adapter voltage detect and threshold circuit 215 may detect the voltage level of VADP and set UVTH accordingly for detecting a low voltage condition. The power interface controller 201 also controls the adapter interface 203 to interface the power adapter 103 to the system load 113. For example, an isolation switch may be activated or switching of a voltage converter may be commenced depending upon the particular implementation. In this manner, the power adapter 103 begins providing current (IADP) to the system load 113 of the electronic device 109.

After block 303, operation advances to block 304 in which it is queried whether the UV signal is asserted indicating a low voltage condition of the power adapter 103. UV is asserted low when VADP falls below UVTH (e.g., VADP<UVTH). Since the maximum current limit ACLIM is initially set at a lowest level, VADP should not be low and UV should not yet be asserted at least in the first iteration. If UV is not asserted, operation advances to next block 305.

At block 305, it is queried whether IREG is asserted. As previously described, the regulator 209 asserts IREG when it is regulating the adapter current IADP based on the current limit level set by ACLIM. If IREG is not asserted, then operation loops back to block 304 and loops between blocks 304 and 305 until either UV is asserted or IREG is asserted. The load current may be sufficiently low for an indefinite period of time in which operation remains looping at blocks 304 and 305. In fact, the system may remain in this state until the next POR. If the load current does increase such that IADP reaches or otherwise attempts to exceed ACLIM, then the regulator 209 begins regulating the adapter current IADP and asserts IREG.

If IREG is asserted as detected at block 305, then operation proceeds to block 307 in which a regulation delay is inserted. The regulation delay is a suitable or sufficient delay to enable the current control loop to stabilize at the current limit level. In one embodiment, for example, block 307 is implemented to insert a predetermined time delay that is sufficiently long to ensure that the loop becomes stable. In one specific embodiment, block 307 represents a time delay of approximately 10 milliseconds (ms). It is appreciated, however, that different delay values may be used for different implementations. The timing block 217 of the ACLIM control block 211 may be used to facilitate the regulation delay function. Alternatively, block 307 may be implemented using a different loop detection parameter that indicates that the current control loop is stable.

After the regulation delay of block 307, operation advances to block 309 in which it is queried whether the under-voltage signal UV is asserted indicating a low voltage condition of the power adapter 103. UV is asserted low when VADP falls below UVTH (e.g., VADP<UVTH). If UV is not detected asserted at block 309, then operation advances to block 311 in which ACLIM is increased by an incremental amount ACINC. ACINC is set to a level to provide suitable granularity to ensure detection of any of the maximum current limit levels of multiple power adapters.

For example, any given power adapter may have a maximum current limit level of any one of 500 mA, 1 A, 1.2 A, 1.5 A, 2 A, etc., in which ACINC may be set to an incremental current level of 100 mA. In this manner, if ACLIM is set to correspond with 500 mA with ACINC=100 mA, then at block 309, ACLIM is increased to 600 mA. ACINC may have a lower value, such as 50 mA, to provide a greater granularity and to potentially optimize detection of the actual maximum current limit of the power adapter 103. It is noted, however, that reducing ACINC may increase the amount of time for determining the maximum current limit (e.g., requiring more iterations). Also, ACINC should not be too small such that the final determined value may potentially exceed the maximum current limit of the power adapter 103. The optimal determination of ACLOW and ACINC is selected based on the range of capabilities of the expected power adapters to be used.

After ACLIM is increased by ACINC, operation loops back to block 304 to query whether UV is asserted, and if not, to once again loop between blocks 304 and 305 until UV or IREG is asserted as previously described.

As previously noted, ACLIM is initially set at the predetermined lowest value ACLOW, so that during normal operation when load current attempts to rise above the present level of ACLIM, the regulator 209 regulates the current control loop for at least the regulation delay set at block 307. After expiration of the regulation delay, ACLIM is increased by the incremental amount ACINC. ACLIM may be increased by ACLIM multiple times in this manner as long as the power adapter 103 is capable of supplying the increased load current. Also, operation may remain indefinitely at any one of the levels of ACLIM as long as UV is not asserted indicating that the power adapter 103 is not overextended.

If the adapter current IADP continues to increase such that ACLIM is incrementally increased above the actual maximum current limit of the power adapter 103, then the power adapter 103 temporarily provides more current than its maximum capacity such that VADP falls below UVTH. It is noted that power adapters may be designed to provide current above their maximum level for a limited time, even though the voltage level drops below their normal operating voltage range. When VADP falls below UVTH, the adapter voltage comparator 213 asserts UV. UV may be detected asserted at either block 304 or 309. For example, after ACLIM is increased at block 311, UV may be asserted very quickly and detected at block 304. Block 304 is included since it is possible that UV asserts without achieving current loop regulation. Alternatively, the current loop may regulate fairly quickly such that IREG is asserted before UV, in which UV is asserted after initiation of regulation. In this case, UV is asserted during the regulation delay 307 and detected at block 309. In either case, operation advances to block 313 from either block 304 or 309 when UV is detected asserted.

At block 313, ACLIM is decreased by ACINC to go back to the previous setting of ACLIM that did not cause the power adapter 103 to be overloaded; that is, the last setting of ACLIM that did not cause VADP to fall below the threshold level of UVTH. After ACLIM is adjusted at block 313, ACLIM is set at a final limit value, shown as ACMAX, that is at or near the actual maximum current limit of the power adapter 103.

After ACLIM is set to ACMAX at block 313, operation advances to block 315 to again query whether the power adapter 103 is connected. While the power adapter 103 remains connected, operation remains at block 315 so that ACLIM remains at ACMAX. If the power adapter 103 is subsequently not detected at block 315, such as when it has been removed during operation, operation returns back to block 301 in which ACMIN is reset back to ACLOW. Thereafter, if the power adapter 103 is reconnected, or if a different power adapter is connected, the procedure is repeated to find ACMAX for the same power adapter 103 or for a different power adapter. Note, for example, that a different power adapter with a different power capacity may be subsequently connected after the power adapter 103 is removed, in which ACMAX is not the same. The power interface controller 201 is configured to detect ACMAX for the new power adapter.

Figure 4:
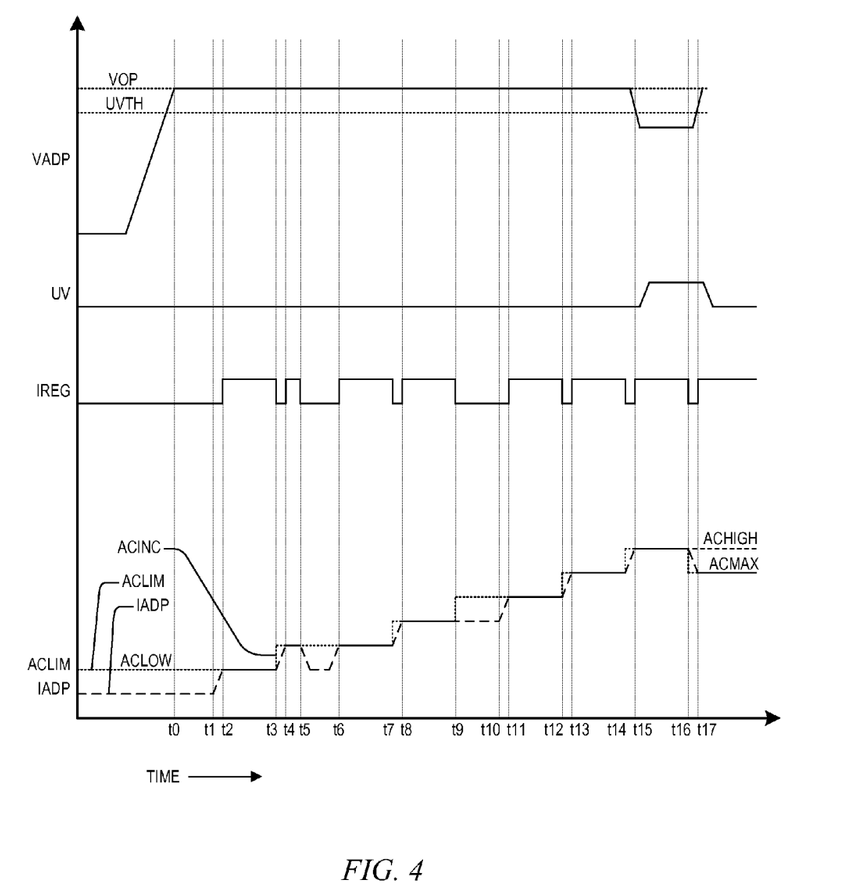
FIG. 4 is a timing diagram illustrating operation of the power interface controller of FIG. 2 according to one embodiment in response to detection of a power adapter coupled to the electronic device of FIG. 1.

FIG. 4 is a timing diagram illustrating operation of the power interface controller 201 according to one embodiment in response to detection of the power adapter 103 coupled to the electronic device 109. The timing diagram plots VADP versus time. Superimposed for comparison with VADP is a predetermined (or normal) operating voltage VOP for the power adapter 103, and the under-voltage threshold UVTH. The timing diagram further plots UV, IREG, ACLIM, and IADP (sensed via ISEN) versus time. ACLIM and IADP are superimposed with each other for comparison, in which ACLIM is shown as a dotted line and IADP as a dashed line. When ACLIM and IADP are at the same level, they are plotted as a solid line.

The power adapter 103 is connected and its voltage VADP rises to voltage VOP at about a time t0. As previously described, VOP may have any one of many different voltage levels depending upon the particular capacity of the power adapter 103. UVTH is set accordingly to indicated an under-voltage threshold level. While VADP remains above UVTH, UV remains low.

ACLIM is initially set at the lowest value ACLOW. The adapter current IADP is initially at a low level below ACLIM. Since IADP is below ACLIM, IREG is initially low at time t0. During operation, the adapter current IADP increases at a time t1 until it reaches ACLIM at time t2, and the regulator 209 begins regulating IADP at ACLIM while asserting IREG. The regulator 209 regulates IADP for the regulation delay time to time t3, and the ACLIM control block 211 increases ACLIM by ACINC at time t3. The regulator 209 temporarily stops regulating while IADP is below ACLIM. In this case, IADP continues to increase to the increased level of ACLIM at about time t4, and again the regulator 209 begins regulating IADP at the increased level of ACLIM while asserting IREG.

At a time t5 prior to expiration of the regulation time period that started at time t4, IADP decreases and stays below ACLIM until a subsequent time t6. IREG is de-asserted at time t5 since IADP is not being regulated. Since regulation of IADP terminated before expiration of the regulation time period, ACLIM is not increased. In the illustrated configuration, ACLIM is not increased until regulation of IADP is active for at least the regulation time period. ACLIM may stay at this level indefinitely while IADP stays below ACLIM.

At time t6, IADP has increased back to ACLIM so that the regulator 209 begins regulating IADP again while asserting IREG. At time t7 after expiration of the regulation time period, the ACLIM control block 211 again increases ACLIM by ACINC and regulation is temporarily suspended. IADP continues to increase to the increased level of ACLIM at about time t8, and again the regulator 209 regulates IADP at the increased level of ACLIM while asserting IREG for the regulation delay time to a time t9.

At time t9, the ACLIM control block 211 increases ACLIM by ACINC. In this case, however, IADP does not increase but instead stays below the increased level of ACLIM. ACLIM may remain at this level indefinitely while IADP remains below it. This is true for any level of ACLIM while the adapter voltage remains above UVTH. While IADP remains below ACLIM, the current control loop is opened so that the regulator 209 does not regulate IADP and IREG remains low.

At subsequent time t10, IADP once again increases until it reaches ACLIM at time t11. In response, the regulator 209 regulates IADP at ACLIM for the regulation delay to time t12, at which time the ACLIM control block 211 increases ACLIM by ACINC. Again, IADP increases to the newly increased level of ACLIM at time t13, at which time the regulator 209 regulates IADP at ACLIM for the regulation delay to time t14. At time t14, the ACLIM control block 211 increases ACLIM by ACINC. Up until time t14, the incremental increases of ACLIM in response to increasing IADP did not overextend the power adapter 103 since it was able to supply the requested level of load current.

From time t14 to t15, IADP increases again and the regulator 209 regulates at the new level for the regulation delay period from time t15 to time t16. In this case, however, the output voltage of the adapter VADP decreases below UVTH at about time t15 causing the adapter voltage comparator 213 to assert UV after time t15. At this point, ACLIM has been incremented to an excessive current level shown as ACHIGH, in which the power adapter 103 is temporarily overextended. In response to UV being asserted, the ACLIM control block 211 decreases ACLIM by ACINC at time t16 to a final current limit level shown as ACMAX. Because IADP is being regulated by the regulator 209, IADP is reduced back to ACMAX at time t17. Since ACLIM is reduced back after time t17 to the same level that it was between times t13 and t14, the power adapter 103 is not overextended and VADP returns back to VOP. In response, UV goes back low after time t17. ACMAX is thus at or near the actual maximum current limit of the power adapter 103.

After time t17, the adapter current IADP may range at any level up to ACLIM set at ACMAX. If IADP attempts to go above ACLIM set at ACMAX, the regulator 209 assumes control of the current loop to regulate IADP at ACMAX. In this manner, the ACLIM control block 211 asserts ACLIM at ACMAX for the duration of operation of the electronic device 109 while the power adapter 103 remains connected, in which ACMAX is the maximum current limit of the power adapter 103. As previously described with reference to FIG. 2, if the power adapter 103 is removed after ACLIM has been set at ACMAX as described herein, then ACLIM is reset back to ACLOW.

Figure 5:
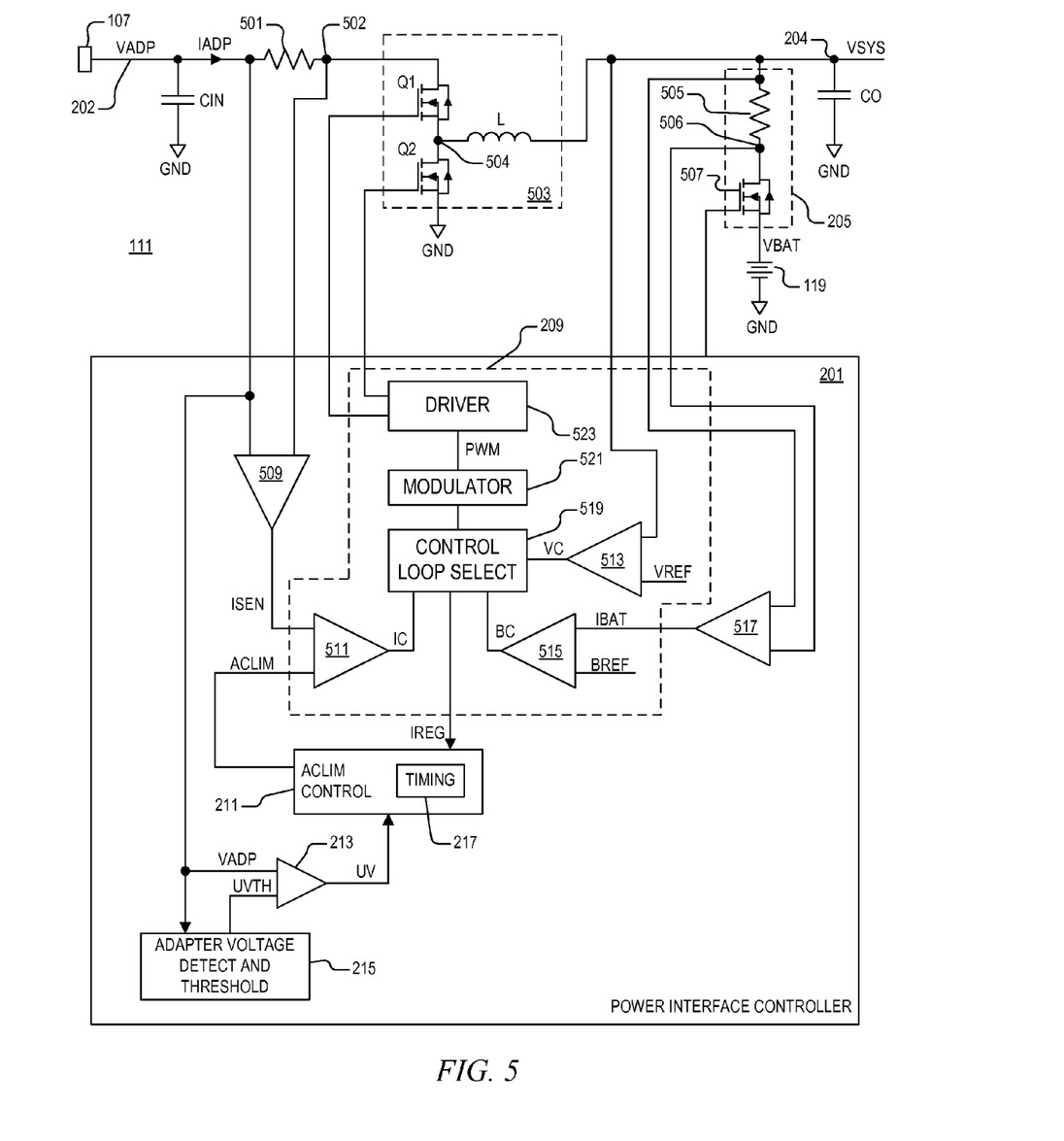
FIG. 5 is a more detailed schematic and block diagram of the power interface of FIG. 1 implemented according to a more specific embodiment of the present invention.

FIG. 5 is a more detailed schematic and block diagram of the power interface 111 implemented according to a one embodiment of the present invention. The connector 107 is shown coupled to the input node 202, which is filtered by an input capacitor CIN coupled between node 202 and GND. The current sensor 207 is implemented as a current sense resistor 501 coupled between node 202 and another node 502, which is coupled to an input of the adapter interface 203. The adapter interface 203 includes or is otherwise implemented using a converter 503. The converter 503 includes a field-effect transistor (FET) Q1, having its drain coupled to node 502 and its source coupled an intermediate node 504. Another FET Q2 has its drain coupled to node 504 and its source coupled to GND. The converter 503 includes an inductor L coupled between node 504 and the output node 204 developing VSYS. VSYS is filtered with an output filter capacitor CO coupled between node 204 and GND.

The battery interface 205 includes a sense resistor 505 coupled between node 204 and an intermediate node 506. Another FET 507 has its source coupled to node 506 and its drain coupled to the rechargeable battery 119 developing the battery voltage VBAT. The gate of FET 507 is coupled to the power interface controller 201 for controlling charge and discharge of the rechargeable battery 119. For example, when the power adapter 103 is not connected, the FET 507 may be turned fully on to provided power to the system load 113 via VSYS. When the power adapter 103 is connected, the FET 507 may be controlled in a linear manner to control charging of the rechargeable battery 119.

The FETs Q1, Q2 and 507 are shown implemented using N-channel MOSFETs, although other types of switching devices are contemplated, such as P-channel devices, other similar forms (e.g., FETs, MOS devices, etc.), bipolar junction transistor (BJTs) and the like, insulated-gate bipolar transistors (IGBTs) and the like, etc.

The power interface controller 201 includes a sense amplifier 509 having input terminals coupled to nodes 202 and 502 across the sense resistor 501 for sensing IADP, and having an output terminal providing ISEN to one input of an error amplifier 511 within the regulator 209. The adapter voltage comparator 213, the adapter voltage detect and threshold circuit 215 and the ACLIM control block 211 are included and coupled in a substantially similar manner for sensing VADP, providing UVTH, asserting UV, receiving IREG and providing and incrementally adjusting ACLIM. ACLIM is provided to the other input of the error amplifier 511, which has an output providing a current control signal IC.

The regulator 209 includes another error amplifier 513, which has a first input coupled to the output node 204 for receiving VSYS (or a sensed version thereof), which has a second input receiving a reference voltage VREF, and which has an output providing a voltage control signal VC. The power interface controller 201 includes a sense amplifier 517 having input terminals coupled to nodes 204 and 506 for sensing voltage across the sense resistor 505, and having an output terminal providing a signal IBAT indicative of the current of the rechargeable battery 119. The regulator 209 includes another error amplifier 515, which has a first input coupled to the output of the sense amplifier 517 for receiving IBAT, which has a second input coupled to receive a reference signal BREF, and which has an output providing a battery control signal BC.

The control signals IC, VC and BC are provided to respective inputs of a control loop select block 519, which provides the current regulation signal IREG to the ACLIM control block 211. The control loop select block 519 is coupled to a modulator 521, which provides a pulse width modulation (PWM) signal to a driver block 523. The driver block 523 has two outputs coupled to the gates of Q1 and Q2 for controlling the converter 503. In one embodiment, the modulator 521 controls the converter 503 as a buck converter in which the adapter voltage VADP is converted to the voltage level of VSYS. In a similar manner as previously described for the adapter interface 203, the converter 503 may be operated as or otherwise replace by a boost converter or a buck-boost converter based on the expected voltage ranges of VADP and VSYS.

The control loop select block 519 monitors the control signals IC, VC and BC to determine which of the error amplifiers 511, 513 or 515 controls operation of the modulator 521. For example, if the load current is within a normal range and the rechargeable battery 119 is fully charged, then the control loop select block 519 may select the error amplifier 513 to control the voltage level of VSYS based on VREF.

When the adapter current IADP rises to the level of ACLIM, then the control loop select block 519 may select the error amplifier 511 to ensure that the adapter current IADP does not rise above the present value of ACLIM. In this case, when the error amplifier 511 is controlling the loop, then the control loop select block 519 asserts IREG to the ACLIM control block 211. As previously described, if ACLIM is not yet at ACMAX, then after a regulation delay period, the ACLIM control block 211 incrementally increases ACLIM (e.g., by ACINC). This may cause the control loop select block 519 to select, at least temporarily, another error amplifier (e.g., either 513 or 515) to control the loop. If IADP increases to the increased level of ACLIM, then the error amplifier 511 once again gains control of the loop, and the ACLIM control block 211 again incrementally increases ACLIM. Eventually, if ACLIM is increased such that the adapter voltage comparator 213 asserts UV, then the ACLIM control block 211 incrementally decreases ACLIM (e.g., by ACINC) to its final level ACMAX. In this manner, the maximum adapter current level is determined and stored by the power interface controller 201.

The benefits, features, and advantages of the present invention are now better understood with regard to the foregoing description and accompanying drawings. The foregoing description was presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. An electronic device that determines an adapter current limit for a power adapter when the power adapter is connected to the electronic device, said electronic device comprising:
   a regulator that regulates an adapter output current level at an adapter current limit to prevent said adapter output current level from exceeding said adapter current limit, and that provides a regulation signal indicative thereof;
   a voltage comparator that provides an under-voltage signal when a low voltage threshold exceeds an adapter output voltage level; and
   a controller that provides and adjusts said adapter current limit, wherein said controller is operative to:
      initially set said adapter current limit at a predetermined lowest level;
      increase said adapter current limit by an incremental amount when said regulation signal is provided; and
      when said under-voltage signal is provided, decrease said adapter current limit by said incremental amount to determine a final adapter current limit.

2. The electronic device of claim 1, further comprising a detector that detects said adapter voltage level and that provides said low voltage threshold.

3. The electronic device of claim 2, wherein said low voltage threshold is selected from among a plurality of predetermined voltage thresholds.

4. The electronic device of claim 2, wherein said low voltage threshold is a predetermined percentage of said adapter voltage level.

5. The electronic device of claim 1, wherein said incremental amount is selected based on a plurality of predetermined maximum current limit levels of a corresponding plurality of power adapters.

6. The electronic device of claim 1, wherein said incremental amount is selected to provide suitable granularity to ensure detection of any one of a predetermined plurality of maximum current limit levels of a corresponding plurality of power adapters.

7. The electronic device of claim 1, wherein said controller increases said adapter current limit by said incremental amount after said regulation signal is provided for at least a predetermined amount of time.

8. The electronic device of claim 1, wherein said controller increases said adapter current limit by said incremental amount only after said regulation signal is continuously provided for at least a predetermined amount of time.

9. The electronic device of claim 1, further comprising a system load coupled to said controller, wherein said system load includes a processor coupled to a memory.

10. The electronic device of claim 1, further comprising:
    a system load;
    a connector for coupling to an output of the power adapter and to an internal adapter node;
    an adapter interface coupled between said adapter node and said system load and coupled to said controller; and
    wherein said controller interfaces said adapter node for detecting said adapter output current level and said adapter output voltage level.

11. The electronic device of claim 10, further comprising a battery interface coupled to said system load and said controller, wherein said controller comprises a battery charge controller.

12. The electronic device of claim 10, wherein said system load comprises a processor and a memory.

13. A method capable of determining an adapter current limit of a power adapter, comprising:
    regulating an adapter output current level at an adapter current limit to prevent the adapter output current level from exceeding the adapter current limit and providing a regulation signal indicative thereof;
    providing an under-voltage signal when an adapter low voltage threshold exceeds an adapter output voltage level;
    initially setting the adapter current limit at a predetermined lowest level;
    increasing the adapter current limit by an incremental amount when the regulation signal is provided; and
    when the under-voltage signal is provided, decreasing the adapter current limit by the incremental amount to determine a final adapter current limit.

14. The method of claim 13, further comprising:
    detecting the adapter voltage level of the power adapter when connected;
    determining the adapter low voltage threshold based on the detected adapter voltage level.

15. The method of claim 14, wherein said determining the adapter low voltage threshold comprises selecting from among a plurality of predetermined voltage thresholds.

16. The method of claim 14, wherein said determining the adapter low voltage threshold comprises determining the adapter low voltage threshold as a predetermined percentage of the adapter voltage level.

17. The method of claim 13, wherein said increasing the adapter current limit by an incremental amount comprises increasing the adapter current limit by an incremental amount to provide suitable granularity to ensure detection of any one of a predetermined plurality of maximum current limit levels of a corresponding plurality of power adapters.

18. The method of claim 13, wherein:
    said providing a regulation signal comprises providing the regulation signal only while the adapter output current level is regulated at the adapter current limit; and
    wherein said increasing the adapter current limit comprises increasing the adapter current limit by the incremental amount after the regulation signal has been provided for at least a predetermined amount of time.

19. The method of claim 13, wherein:
    said providing a regulation signal comprises providing the regulation signal only while the adapter output current level is regulated at the adapter current limit; and
    said increasing the adapter current limit comprises increasing the adapter current limit by an incremental amount only after the regulation signal has been continuously provided for a predetermined amount of time, and otherwise not increasing the adapter current limit.

* * * * *

UNITED STATES PATENT AND TRADEMARK OFFICE
CERTIFICATE OF CORRECTION

PATENT NO. : 9,715,244 B2
APPLICATION NO. : 14/727397
DATED : July 25, 2017
INVENTOR(S) : Lim et al.

It is certified that error appears in the above-identified patent and that said Letters Patent is hereby corrected as shown below:

In the Specification

In Column 3, Line 52, delete "battery interface 105," and insert -- battery interface 205, --, therefor.

In Column 7, Line 56, delete "to indicated" and insert -- to indicate --, therefor.

In Column 9, Line 42, delete "transistor" and insert -- transistors --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*